(12) United States Patent
Rempfler et al.

(10) Patent No.: US 11,667,000 B2
(45) Date of Patent: Jun. 6, 2023

(54) CUTTING MACHINE

(71) Applicant: ZÜND SYSTEMTECHNIK AG, Altstätten (CH)

(72) Inventors: Leo Rempfler, Appenzell (CH); Markus Göldi, Lüchtingen (CH); Fabian Steiger, Altstätten (CH); Simon Jann, Altstätten (CH)

(73) Assignee: ZÜND SYSTEMTECHNIK AG, Altstätten (CH)

( * ) Notice: Subject to any disclaimer, the term of this patent is extended or adjusted under 35 U.S.C. 154(b) by 555 days.

(21) Appl. No.: 16/779,379

(22) Filed: Jan. 31, 2020

(65) Prior Publication Data
US 2020/0246926 A1  Aug. 6, 2020

(30) Foreign Application Priority Data
Feb. 1, 2019 (EP) .................... 19155068

(51) Int. Cl.
*B23Q 3/155* (2006.01)
*B26D 5/00* (2006.01)
(Continued)

(52) U.S. Cl.
CPC ......... *B23Q 3/15546* (2013.01); *B26D 5/007* (2013.01); *B26D 7/2614* (2013.01); *B26F 1/3813* (2013.01)

(58) Field of Classification Search
CPC .. B26D 7/2614; B26D 5/007; B23Q 3/15546; B26F 1/3813
See application file for complete search history.

(56) References Cited

U.S. PATENT DOCUMENTS 4,497,029 A * 1/1985 Kiyokawa ............ G05B 19/404
                                                    318/632
5,257,199 A * 10/1993 Tsujino ............ G05B 19/41825
                                                    235/375

(Continued)

FOREIGN PATENT DOCUMENTS

CN  101541162 A  9/2009
CN  105189058 A  12/2015
(Continued)

*Primary Examiner* — Sean M Michalski
(74) *Attorney, Agent, or Firm* — Muncy, Geissler, Olds & Lowe, P.C.

(57) ABSTRACT

A cutting machine having a work surface, configured to accommodate at least one object to be cut, a working group, which is movable above the work surface including a receptacle device for accommodating a replaceable cutting tool, and a processing unit for controlling the cutting machine and storage capacity for providing a database, characterized by a first sensor unit, which is designed to detect individual items of identification information of the cutting tool and to provide detected items of identification information to the processing unit, wherein the processing unit is designed to recognize the cutting tool based on the items of identification information, to detect operating data of the cutting tool and store these data in the database, wherein the operating data comprise at least one operating time of the cutting tool, and to carry out operational monitoring of the cutting tool based on the operating data.

15 Claims, 10 Drawing Sheets

(51) Int. Cl.
*B26D 7/26* (2006.01)
*B26F 1/38* (2006.01)

(56) References Cited

U.S. PATENT DOCUMENTS

| | | | | |
|---|---|---|---|---|
| 5,313,402 | A * | 5/1994 | Ito | G05B 19/182 |
| | | | | 700/184 |
| 5,446,672 | A * | 8/1995 | Boldys | G07C 3/04 |
| | | | | 700/174 |
| 5,787,018 | A * | 7/1998 | Bolan | G06K 7/0008 |
| | | | | 73/761 |
| 6,585,628 | B1 * | 7/2003 | Tsung | B23C 5/00 |
| | | | | 700/169 |
| 7,096,961 | B2 * | 8/2006 | Clark | E21B 17/028 |
| | | | | 166/380 |
| 2002/0144579 | A1 * | 10/2002 | Alsten | B26D 5/005 |
| | | | | 83/13 |
| 2003/0047045 | A1 * | 3/2003 | Alsten | B26D 5/005 |
| | | | | 83/13 |
| 2004/0083862 | A1 * | 5/2004 | Mikkelsen | B26D 5/34 |
| | | | | 83/13 |
| 2006/0196381 | A1 * | 9/2006 | Mikkelsen | B26D 5/00 |
| | | | | 101/485 |
| 2010/0171276 | A1 | 7/2010 | Kaneko | |

FOREIGN PATENT DOCUMENTS

| | | |
|---|---|---|
| CN | 206326367 U | 7/2017 |
| DE | 20309394 U1 | 11/2003 |
| DE | 102013106427 A1 | 12/2014 |
| EP | 0155662 A2 | 9/1985 |
| EP | 0230642 B1 | 8/1987 |
| EP | 1385674 B | 2/2004 |
| EP | 2488333 B | 8/2012 |
| EP | 2894014 B1 | 7/2015 |
| JP | 2003071672 A | 3/2003 |
| WO | 2011045729 A1 | 4/2011 |
| WO | 2011045792 A1 | 4/2011 |
| WO | 2015010704 A1 | 1/2015 |

* cited by examiner

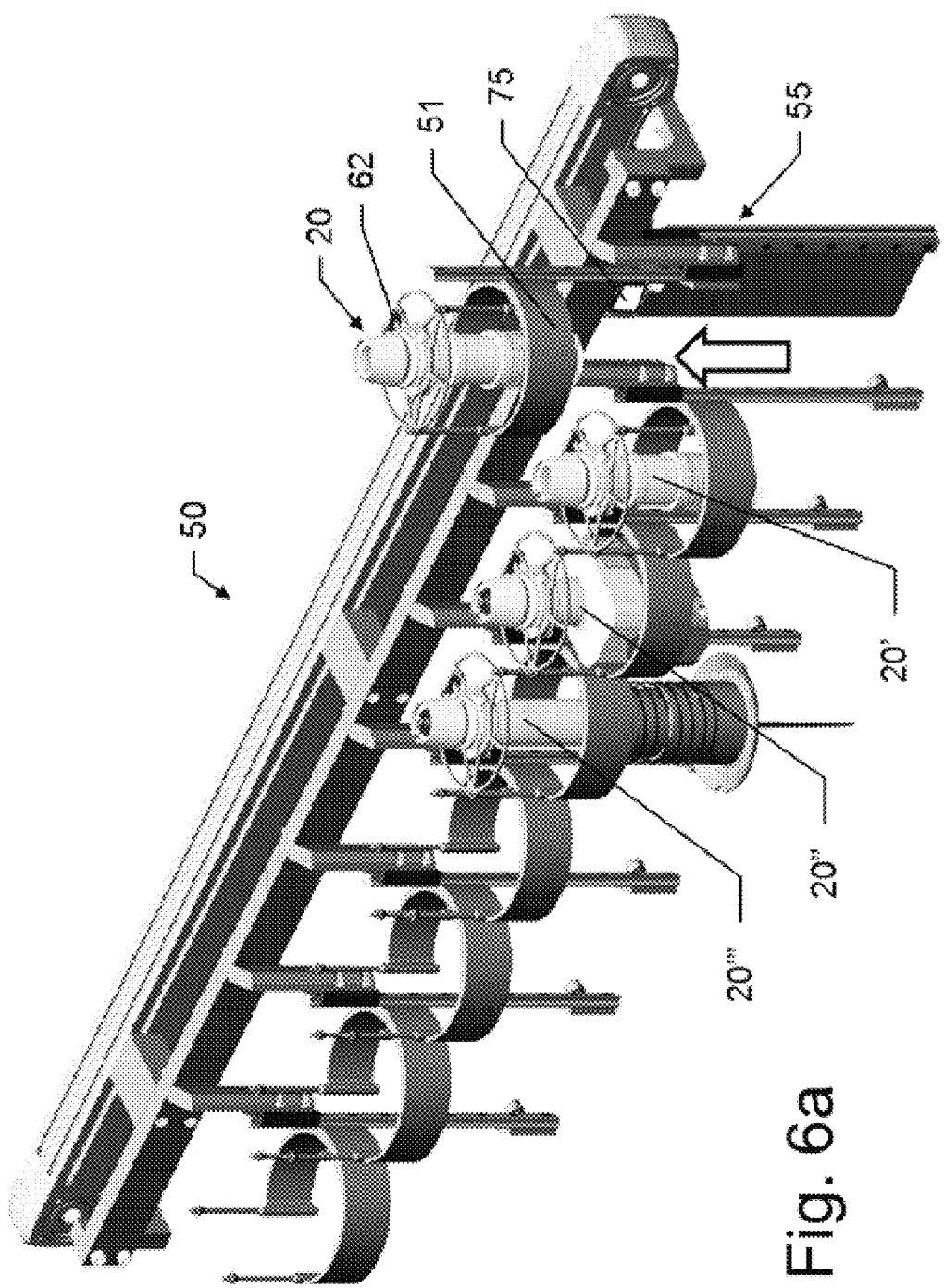

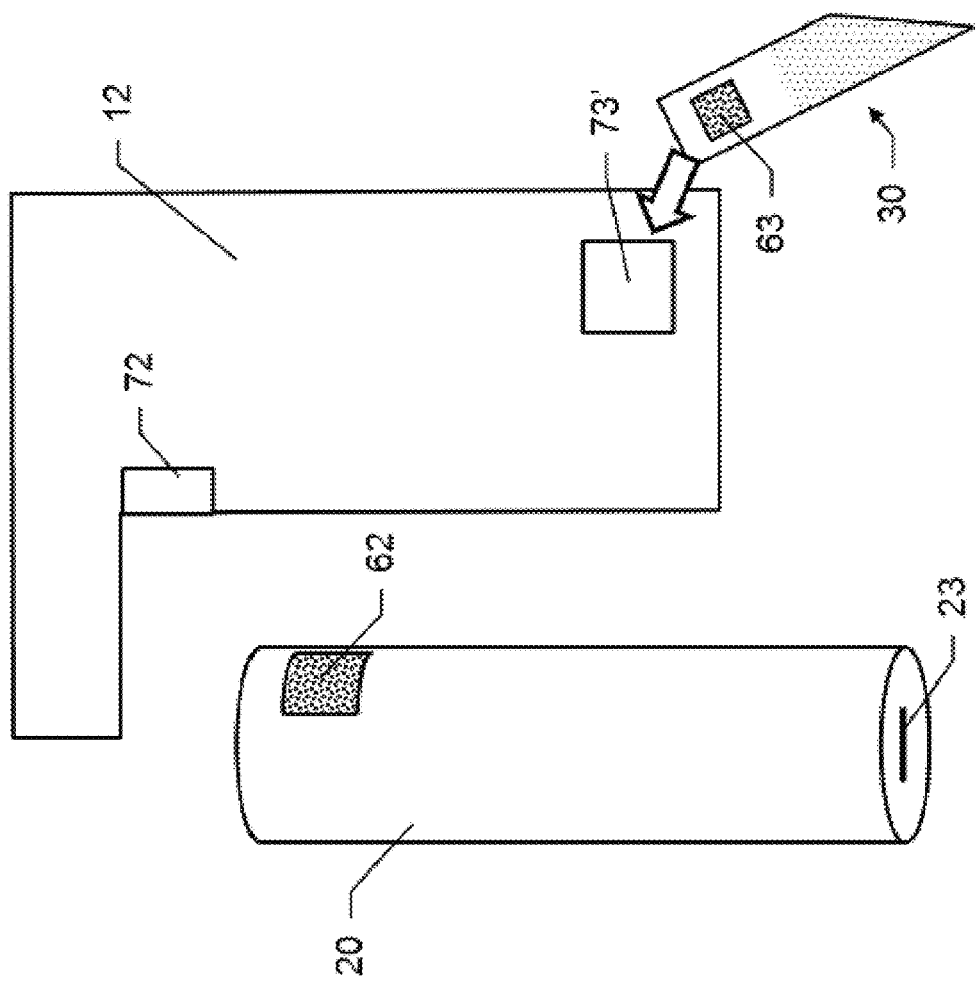
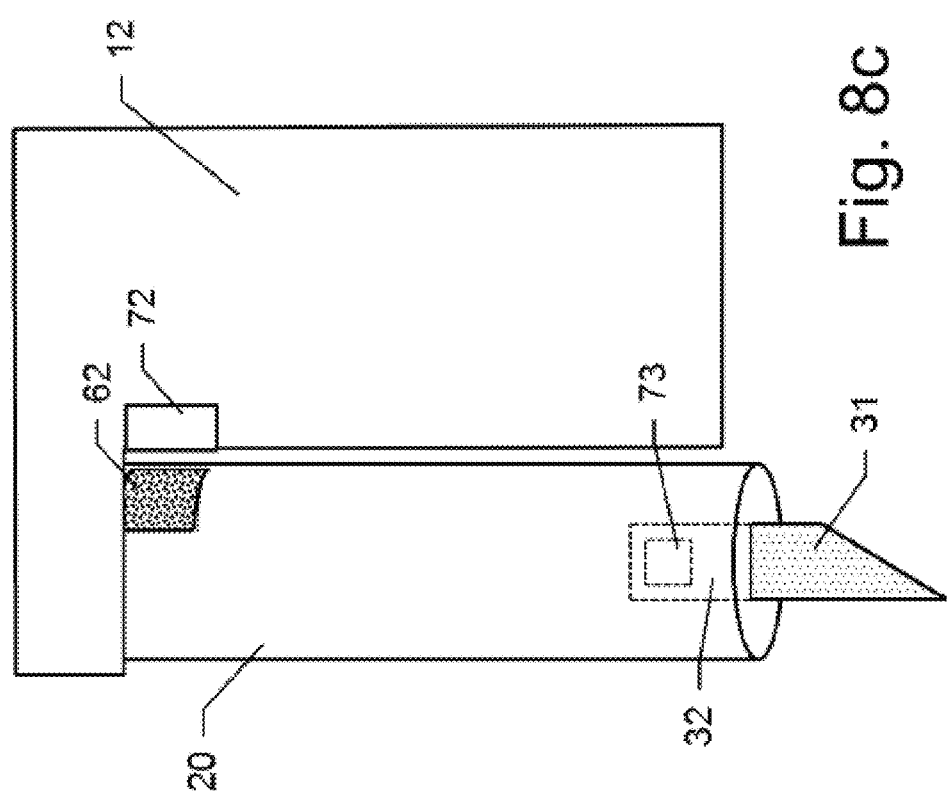

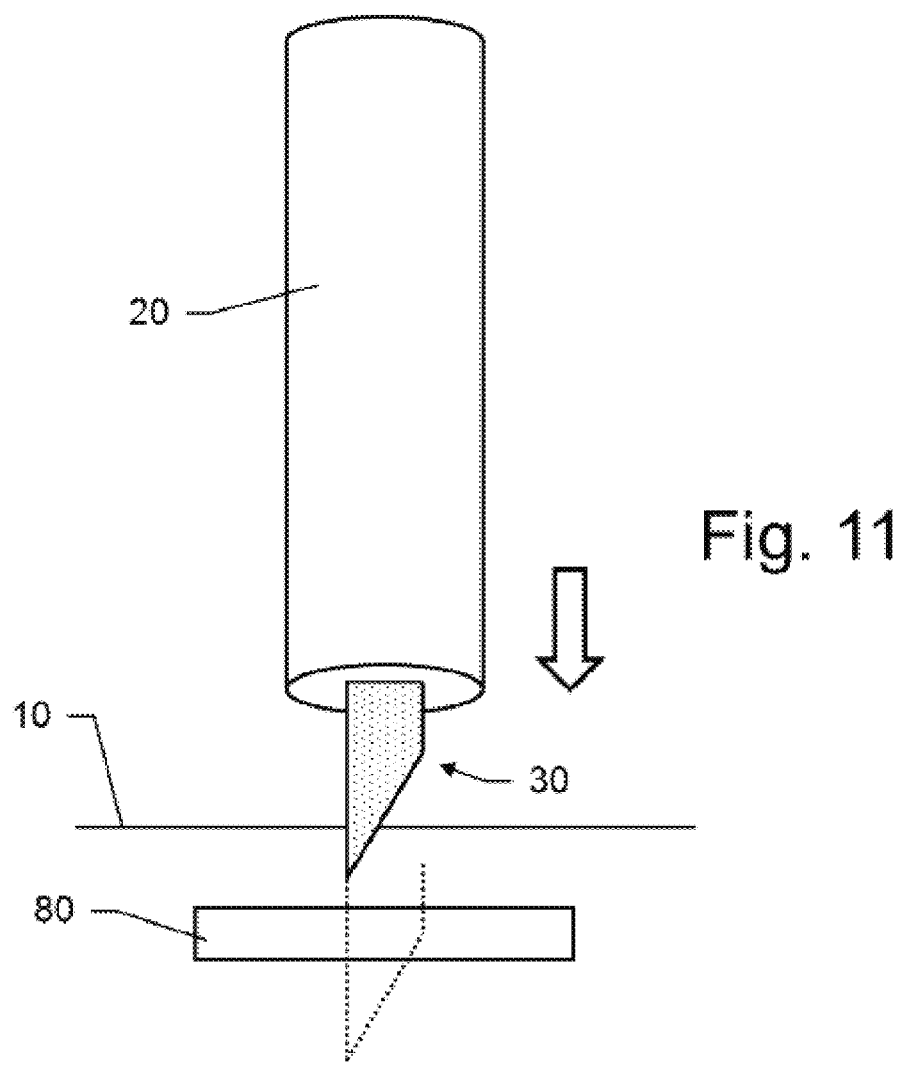

CUTTING MACHINE

CROSS-REFERENCE TO RELATED APPLICATIONS

The present application claims priority to European Patent application 19155068.0 filed Feb. 1, 2019 which is herein incorporated by reference in its entirety.

BACKGROUND

The invention relates to a cutting machine having replaceable tools for cutting objects. In particular, these objects can represent printed or unprinted sheets made of paper, cardboard, or similar materials, foams, plastic films, cloths, fiber fabrics, leather, or the like. According to the invention, the cutting machine is designed to identify individual cutting tools. In one embodiment, the cutting machine is designed to monitor operating data of the cutting tools, in particular usage times, for example, to establish maintenance intervals for each of the identified cutting tools.

Machines of the type in question are described, for example, in the documents EP 1 385 674 B1 and EP 2 488 333 B1. Such a cutting machine comprises a work surface, which is designed to accommodate at least one object, a working group arranged above the work surface having a cutter or another cutting device for cutting objects located on the work surface. "Cutting" is not necessarily to be understood in this case as complete severing, so that a "cutting task" can also include perforating, folding, grooving, or marking the object or a similar work step, which is executable using a machine of the type in question.

SUMMARY

It is an object of the invention to provide an improved cutting machine having replaceable cutting tools.

A further object is to provide such a cutting machine which has an automatic selection function for the usage or replacement of an individual cutting tool, or in which the cutting tools are replaceable fully automatically.

A further object is to provide such a cutting machine which enables automatic operational monitoring of a plurality of individual cutting tools. In particular, it is an object to provide such a cutting machine by means of which maintenance intervals for individual cutting tools can be defined or managed automatically.

At least one of these objects is achieved by the implementation of the characterizing features of the independent claims. Advantageous embodiments of the invention are found in the respective dependent claims.

The present invention relates to a cutting machine having a work surface, which is designed to accommodate at least one object to be cut, a working group, which is arranged movably above the work surface and comprises a receptacle device for accommodating a replaceable cutting tool, and a processing unit, comprising a processor having processing capacity and algorithms for controlling the cutting machine and storage capacity for providing a database. The processing unit can be an integral component of the machine or can be externally provided in this case and, for example, can be connected to multiple cutting machines.

A first aspect of the invention relates to such a cutting machine according to the invention having a tool changing unit for providing a plurality of cutting tools, wherein the processing unit is designed to control an automated insertion of one of the cutting tools provided in the tool changing unit into the receptacle device (and/or a replacement of one inserted cutting tool with another one). In this case, the tool changing unit comprises a plurality of holding devices for providing the plurality of cutting tools and a first sensor unit for detecting individual items of identification information of the cutting tools. This first sensor unit is designed to detect the individual items of identification information of a cutting tool when it is located in a first holding device or is inserted into the first holding device, and to provide the detected items of identification information to the processing unit. The processing unit is designed to recognize cutting tools based on the provided items of identification information, to store items of information about recognized cutting tools in the database, and to select which of the cutting tools provided in the tool changing unit is inserted into the receptacle device based on the detected individual items of identification information (and/or by which cutting tool a cutting tool inserted into the receptacle device is replaced).

In one embodiment of this cutting machine, the processing unit is designed to detect operating data of a cutting tool inserted into the receptacle device and store these data in the database, wherein the operating data comprise at least one operating time of the cutting tool, and wherein the processing unit is also designed to select, based on operating data of the plurality of cutting tools, which of the cutting tools provided in the tool changing unit is inserted into the receptacle device.

Alternatively or additionally, the operating data can also be stored directly in the cutting tool. For this purpose, RFID chips or contactable memories can be installed in the cutting tools, which enable a readout of the stored operating data. In particular, a data exchange can also take place by means of near-field communication.

In a further embodiment of this cutting machine, the cutting tools are each designed to accommodate a replaceable cutter, wherein the cutting machine comprises input means for providing items of identification information of a cutter, wherein an association of the cutter with one of the cutting tools takes place, and wherein the processing unit is designed to link the operating data of a first cutting tool to operating data of a cutter associated with the first cutting tool in the database and also to select, based on operating data of a plurality of cutters, which of the cutting tools provided in the tool changing unit is inserted into the receptacle device.

The input means can comprise, for example, a second sensor unit or can be designed as such, wherein the second sensor unit is designed to detect the items of identification information of the cutter, and to provide detected items of identification information to the processing unit. The processing unit can then be designed to recognize the cutter based on the items of identification information and to detect operating data of the cutter.

A second aspect of the invention relates to such a cutting machine according to the invention, which comprises at least one first sensor unit, which is designed for detecting individual items of identification information of the cutting tool and for providing detected items of identification information to the processing unit. In this case, the processing unit is designed to
 recognize the cutting tool based on the items of identification information,
 detect operating data of the cutting tool and store these data in the database, wherein the operating data comprise at least one operating time of the cutting tool, and
 carry out operational monitoring of the cutting tool based on operating data.

According to one embodiment of this cutting machine, the processing unit is designed to
  store items of identification information of a plurality of replaceable cutting tools in the database,
  detect operating data for each cutting tool of the plurality of cutting tools and store these data in the database, and
  carry out operational monitoring of the plurality of cutting tools based on the operating data.

According to a further embodiment of this cutting machine, the first sensor unit is arranged on the working group and is designed to detect the items of identification information of the cutting tool when it is inserted into the receptacle device or is already located in the receptacle device. In particular, the sensor unit can be arranged on the receptacle device of the working group.

According to a further embodiment, the cutting machine comprises a second sensor unit, which is designed to detect individual items of identification information of a cutter which is insertable into the cutting tool, and to provide detected items of identification information of the cutter to the processing unit. In this case, the processing unit is designed to recognize this cutter based on the items of identification information, to detect operating data of the cutter and store these data in the database, wherein the operating data comprise at least one operating time of the cutter, and to carry out operational monitoring of the cutter based on the operating data. In particular, the second sensor unit can also be an optical sensor unit, which is designed to detect an identification code which can be optically detected on the cutting tool, for example, a DataMatrix code, QR code, or the like. The identification code provides the individual items of identification information of the cutting tool so they are detectable by the first sensor unit. Moreover, the processing unit can be designed to link the operating data of the cutter and the operating data of the cutting tool to one another in the database.

According to a further embodiment of this cutting machine, the operational monitoring comprises monitoring operating times and/or states of the plurality of replaceable cutting tools or cutters inserted into the cutting tools. In this case, the processing unit is at least designed, on the basis of the operational monitoring, to define a maintenance interval for a cutting tool, to trigger maintenance for a cutting tool, to define a replacement interval for cutting tools, in particular for two or more congeneric cutting tools, to trigger replacement of a cutting tool, to define a replacement interval for cutters, or to trigger replacement of a cutter.

According to a further embodiment, the cutting machine according to the invention comprises a tool changing unit for automatically inserting a cutting tool into the receptacle device.

The tool changing unit can be designed in this case in particular for automated replacement of a cutting tool located in the receptacle device with another cutting tool, which is provided in the tool changing unit. The tool changing unit can also be designed to provide a plurality of different cutting tools.

In one embodiment, the tool changing unit is positioned on the cutting machine in such a way that the receptacle device can be positioned on the tool changing unit for the automated insertion or replacement of a cutting tool in relation to a movement range of the working group, for example, above the tool changing unit.

In one embodiment, the tool changing unit comprises a plurality of holding devices for providing a plurality of cutting tools, wherein each of the holding devices comprises at least one support, in particular three supports, wherein the supports are designed to contact a supporting device of the provided cutting tool.

In one embodiment, the sensor unit is attached to the tool changing unit and is designed to detect items of identification information of the cutting tool provided on the supporting device of the cutting tool when the cutting tool is located in the tool changing unit.

In a further embodiment, the sensor unit is attached to the tool changing unit and is designed to detect the items of identification information of the cutting tool when the cutting tool is located in the tool changing unit or is inserted into the receptacle device.

In a further embodiment, an automatic selection of a cutting tool from the plurality of cutting tools provided in the tool changing unit for insertion into the receptacle device is based on the detected items of identification information of the cutting tool.

According to one embodiment of the cutting machine of the first or second aspect of the invention, the first sensor unit is an optical sensor unit which is designed to detect an optically detectable identification code, in particular a DataMatrix code, on the first cutting tool, wherein the identification code provides the individual items of identification information of the first cutting tool so they are detectable by the first sensor unit.

In addition to optical solutions, diverse other known solutions for code detection are also conceivable in principle. Alternatively, the first sensor unit can comprise, for example, an RFID read device (RFID=radio-frequency identification), which is designed to detect an identification code provided in an RFID transponder of the cutting tool, which comprises or provides the individual items of identification information of the first cutting tool. The sensor unit can also be designed to retrieve the identification code, and/or the individual items of identification information, by means of near-field communication from the cutting tool. Furthermore, the first sensor unit for reading out the items of identification information can alternatively be designed for mechanically contacting the cutting tool. For example, to establish an electrical contact with a storage unit of the cutting tool (for example, via a USB interface) or to scan a raised code applied to a surface of the cutting tool, which provides the items of identification information.

According to a further embodiment of the cutting machine of the first or second aspect of the invention, in which the first cutting tool comprises a cutter holder for accommodating a holding section of a cutting machine cutter, the processing unit is designed to link the first cutting tool to this cutter in the database.

In particular, the cutting machine comprises a second sensor unit in this case, which is designed to detect individual items of identification information of the cutter and to provide detected items of identification information to the processing unit. For example, this second sensor unit is an optical sensor unit, which is designed to detect an optically detectable identification code on the cutter, wherein the identification code provides the individual items of identification information of the cutter so they are detectable by the second sensor unit. Furthermore, the processing unit can be designed to
  recognize the cutter based on the items of identification information,
  detect operating data of the cutter and store these data in the database, wherein the operating data comprise at least one operating time of the cutter, link the operating data of the first cutting tool and operating data of the cutter to one another in the database,
carry out operational monitoring of the cutter based on the operating data, and/or
also select, based on operating data of a plurality of cutters, which of the cutting tools provided in a tool changing unit of the cutting machine is inserted into the receptacle device.

In one embodiment, the cutting machine comprises a setup station sensor unit, which is designed, for example, as an area scan camera. This sensor unit is designed to detect individual items of identification information of the first cutting tool and the cutter and to provide detected items of identification information to the processing unit. The processing unit is designed to recognize the first cutting tool and the cutter based on the items of identification information provided by the setup station sensor unit.

In one embodiment, the setup station sensor unit is arranged on a setup station associated with the cutting machine, in particular a control panel of the cutting machine, in such a way that the first cutting tool and the cutter can be manually moved by a user of the cutting machine closer to the setup station sensor unit in such a way that an identification code of the first cutting tool and/or the cutter, which provides the individual items of identification information so they can be detected by the setup station sensor unit, is detectable by the setup station sensor unit.

In one embodiment, the processing unit is designed to link a cutting tool and a cutter to one another in the database, the individual items of identification information of which were detected successively by the setup station sensor unit.

In one embodiment, the setup station sensor unit is designed to detect individual items of identification information of further components, which are designed for connection to the first cutting tool or the working group, wherein the processing unit is designed to recognize the components based on the items of identification information and to link these components in the database to the first cutting tool and the cutter. Such a component can be, for example, a sliding block.

According to a further embodiment of the cutting machine of the first or second aspect of the invention, the cutting machine comprises a blade sensor for detecting a blade shape of a cutter inserted into the first cutting tool. The blade sensor can be designed in particular as a line scan sensor. The blade sensor can naturally also be usable in this case for detecting the shape and size of another tool insert, for example, for ascertaining a milling cutter diameter or a scoring wheel size.

In one embodiment, items of information about a plurality of cutter types (and/or other tool insert types) are stored in the processing unit and comprise items of information about a blade shape or tool shape of the respective cutter or tool insert type, and the processing unit is designed to ascertain a cutter or tool insert type of the cutter or other tool insert inserted into the first cutting tool on the basis of the blade or tool shape detected by the blade sensor.

A third aspect of the present invention relates to a cutting tool for use in a cutting machine, for example, in a cutting machine of the first aspect of the invention. In this case, the cutting tool is designed as replaceably insertable into a receptacle device of the cutting machine and comprises a cutter holder for accommodating a holding section of a cutting machine cutter.

According to this aspect of the invention, the cutting tool comprises a code element, which provides individual identification data of the cutting tool so they are detectable by a sensor unit of the cutting machine. These individual identification data are designed in this case to enable an individual identification of the cutting tool.

In one embodiment of the cutting tool, the code element comprises an optically detectable identification code, for example, in the form of a DataMatrix code detectable by an optical sensor unit, wherein the identification code contains the individual identification data of the cutting tool.

A fourth aspect of the present invention relates to a method for operating a cutting machine—for example, a cutting machine according to the first or second aspect—having a plurality of replaceable cutting tools, comprising
  detecting individual items of identification information of a first cutting tool by means of a first sensor unit of the cutting machine;
  providing detected items of identification information to a processing unit of the cutting machine;
  detecting the items of identification information and identifying the first cutting tool based on the items of identification information by way of the processing unit;
  detecting and storing operating data which can be associated with the first cutting tool, and linking the operating data to the first cutting tool in a database of the processing unit, wherein the operating data comprise at least one operating time of the cutting tool; and
  operational monitoring of the cutting tool based on the operating data.

According to one embodiment of the method, the operational monitoring comprises monitoring operating times and/or states of the plurality of cutting tools and/or cutters inserted therein. The method comprises in this case, based on the operational monitoring
  defining a maintenance interval for a cutting tool;
  triggering maintenance for a cutting tool,
  defining a replacement interval for cutting tools, in particular for two or more congeneric cutting tools,
  triggering a replacement of a cutting tool,
  defining a replacement interval for cutters, and/or
  triggering a replacement of a cutter.

According to a further embodiment, the method comprises an initial linkage of the first cutting tool to a cutting machine cutter to be used jointly therewith—in particular at a setup station of the cutting machine. The initial linkage comprises:
  detecting the individual items of identification information of the first cutting tool by means of a setup station sensor unit (for example, designed as an area scan sensor for detecting a DataMatrix code);
  detecting individual items of identification information of the cutter by means of the setup station sensor unit;
  providing the items of identification information (of cutting tool and cutter) detected by the setup station sensor unit to the processing unit;
  identifying the first cutting tool and the cutter based on the items of identification information by way of the processing unit;
  linking the first cutting tool and the cutter in the database of the processing unit; and
  inserting the cutter into the first cutting tool.

The detection and the insertion can each be performed in this case manually by a user, in a user-assisted (i.e., partially automated) manner, or in a fully automated manner. For example, the user can hold the cutting tool and the cutting machine cutter in succession at the sensor unit to detect the code and subsequently insert the cutter into the cutting tool. The cutting tool thus linked ("married") to the cutter can then be inserted into a tool changing unit of the cutting machine, wherein it is detected by a further (the "first") sensor unit.

A fifth aspect of the present invention relates to a computer program product having program code which is stored on a machine-readable carrier for executing the method for operating a cutting machine, in particular wherein the program is executed in a processing unit of the cutting machine of the first or second aspect of the invention.

BRIEF DESCRIPTION OF THE DRAWING

The cutting machine according to the invention, the cutting tool according to the invention, and the method according to the invention are described in greater detail solely by way of example hereafter on the basis of specific exemplary embodiments schematically illustrated in the drawings, wherein further advantages of the invention are also discussed. In the individual figures:

FIGS. 6a-b shows a replacement battery of the first exemplary embodiment of the cutting machine having multiple replaceable tools;

FIGS. 8a-c show a third exemplary embodiment of a replaceable tool according to the invention and a working group of a third exemplary embodiment of a cutting machine according to the invention;

FIG. 9 shows a fourth exemplary embodiment of a replaceable tool according to the invention and a working group of a fourth exemplary embodiment of a cutting machine according to the invention.

FIG. 11 shows a line scan sensor as a sensor of an exemplary embodiment of a cutting machine according to the invention.

DETAILED DESCRIPTION

Figure 1:
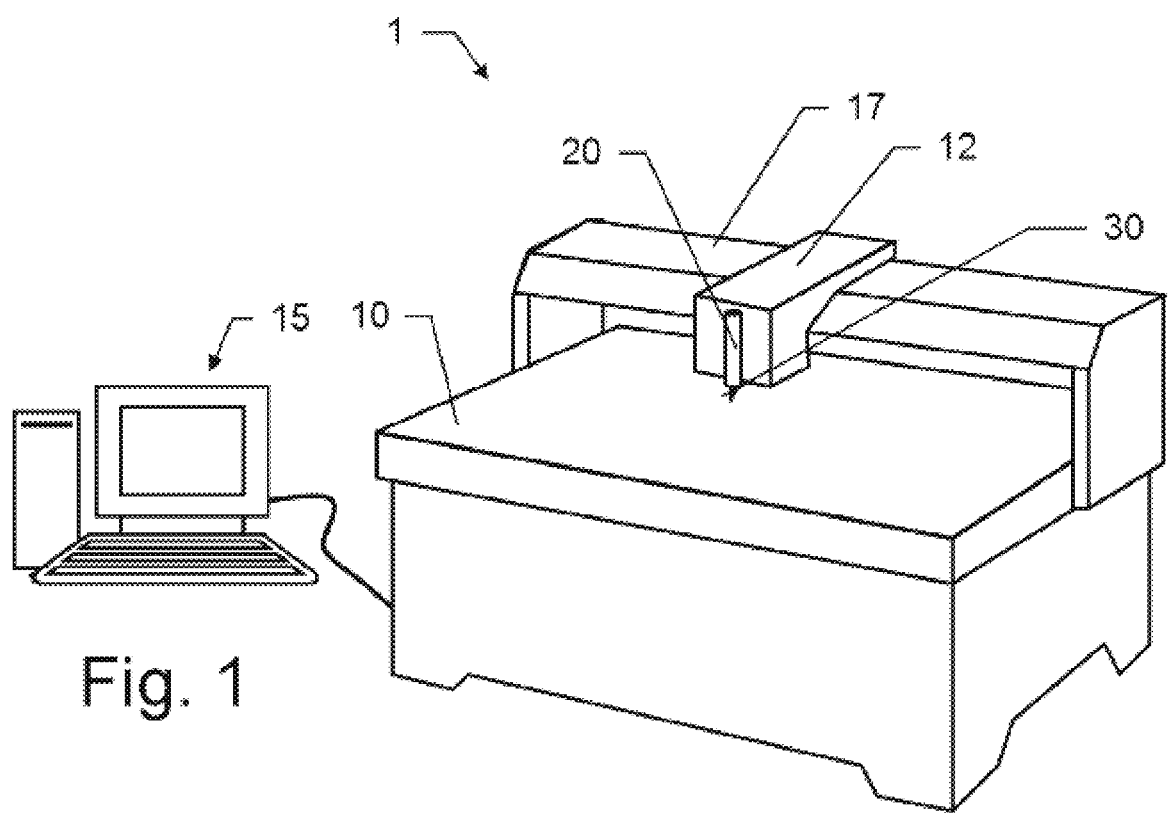
FIG. 1 shows an exemplary embodiment of a cutting machine according to the invention having replaceable tool.

FIG. 1 shows a cutting machine 1 of the type in question. As a flatbed cutting machine, it comprises a table having a planar work surface 10, on which objects to be cut can be placed.

A working group 12 having a cutting tool 20, which comprises a cutter 30, is arranged above the work surface 10. The working group 12 is movable by a motor at least two-dimensionally in relation to the work surface 10 to be able to approach every point of the work surface 10. For this purpose, the working group 12 is attached to a bar 17 so it is movable in a first direction, which bar is in turn attached to the table so it is movable in a second direction. In particular, the cutting machine 1 can also comprise a cutting tool 20 driven to oscillate and can thus be designed for cutting multiwall composite plates, for example, as described in EP 2 894 014 B1.

The cutting machine 1 additionally comprises a processing unit 15. This can be designed as shown here as an external computer, which comprises a data connection to the machine 1, or can be integrated as an internal control unit into the machine 1 itself. The processing unit 15 comprises a processor having processing capacity and algorithms for controlling the cutting machine 1 in accordance with a provided cutting task. The processing unit 15 is designed to control the cutting tool 20 and possibly a camera, in particular to move the working group 12 in relation to the work surface 10. The processing unit 15 moreover comprises a data memory for storing the cutting tasks and possibly further data. The cutting machine can comprise an additional control panel, in which the processing unit 15 or parts thereof are integrated.

Figure 2A:
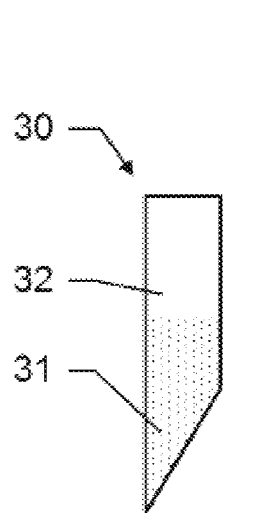
FIG. 2a shows an exemplary embodiment of a cutter for insertion into a tool.
Figure 2B:
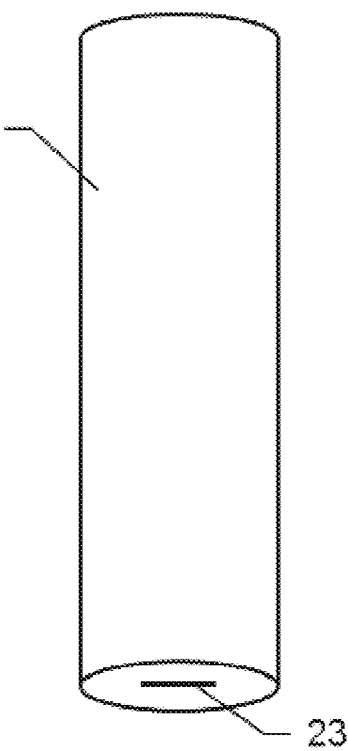
FIG. 2b shows an exemplary embodiment of a replaceable tool having a receptacle for a cutter.
Figure 3A:
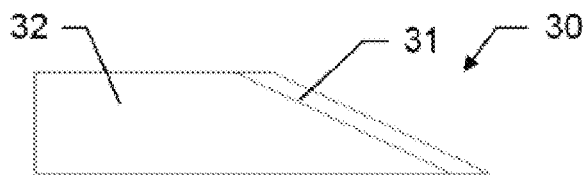
FIGS. 3a-h show further exemplary embodiments of cutters.
Figure 3B:
Figure 3C:
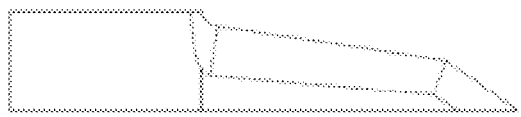
Figure 3D:
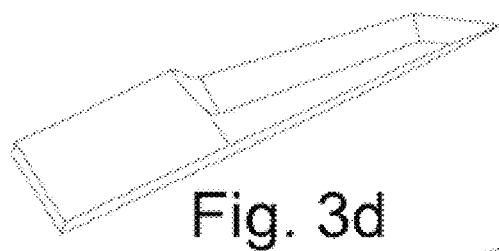
Figure 3E:
Figure 3F:
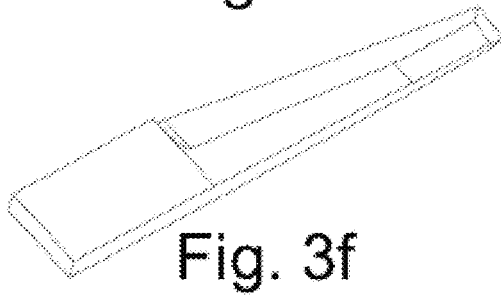
Figure 3G:
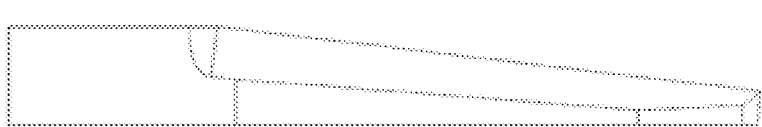
Figure 3H:
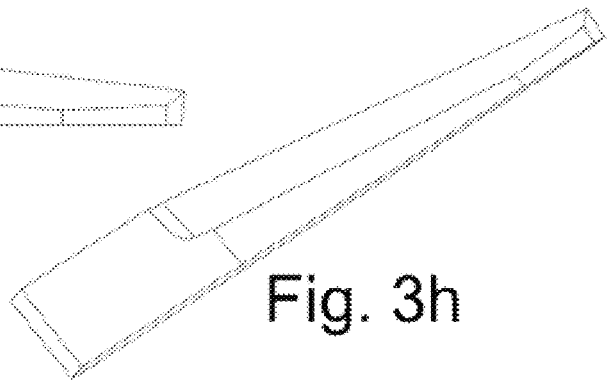

FIGS. 2a and 2b show a replaceable cutter 30 and a replaceable cutting tool 20 of a cutting machine of the type in question, as are known in principle from the prior art. The cutter 30 comprises a cutting region having blade 31 and a holding region 32 for insertion into a receptacle 23 of the cutting tool 20. The cutting tool 20 is designed for use in a cutting machine as shown by way of example in FIG. 1.

FIGS. 3a to 3h show, solely by way of example and not exhaustively, various cutter shapes of cutting machine cutters 30, which are usable with a cutting tool and/or a cutting machine according to the present invention. All of these cutters share the blade 31 and the holding region 32. In addition to cutters (also comprising round and segmented cutters), other tool inserts are also conceivable, for example, saws, milling cutters, or perforation, scoring, and marking tools. In contrast to the cutting tools, the cutters 30 and other tool inserts are typically and regularly consumable material.

Figure 4B:
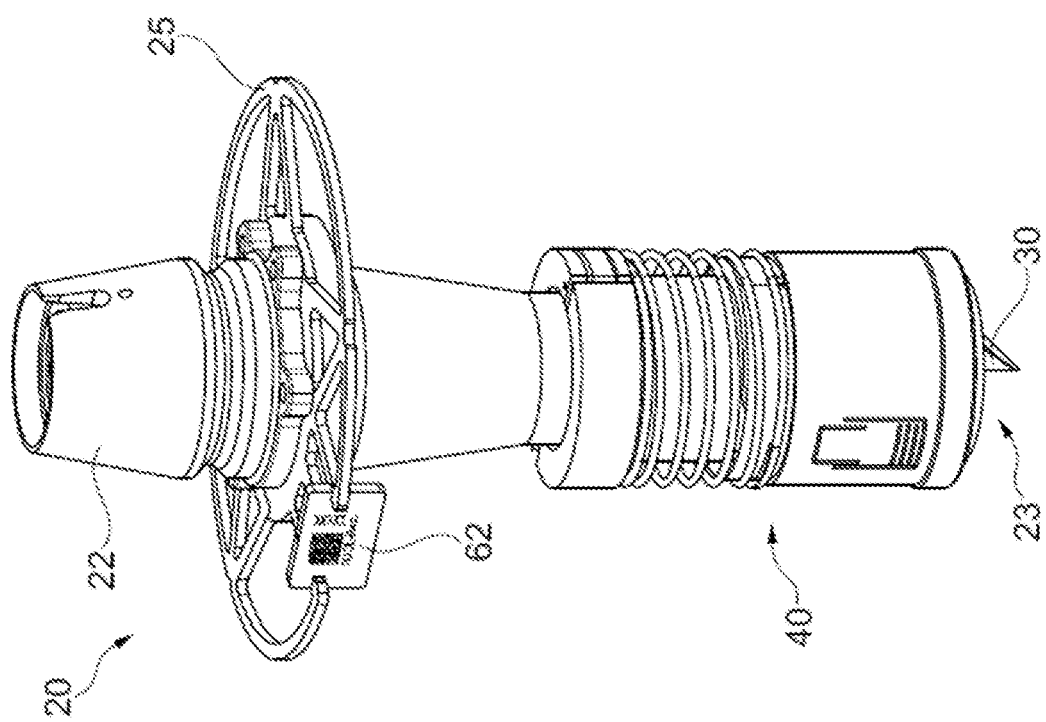
FIGS. 4a-c show exemplary embodiments of a replaceable tool according to the invention.
Figure 4A:
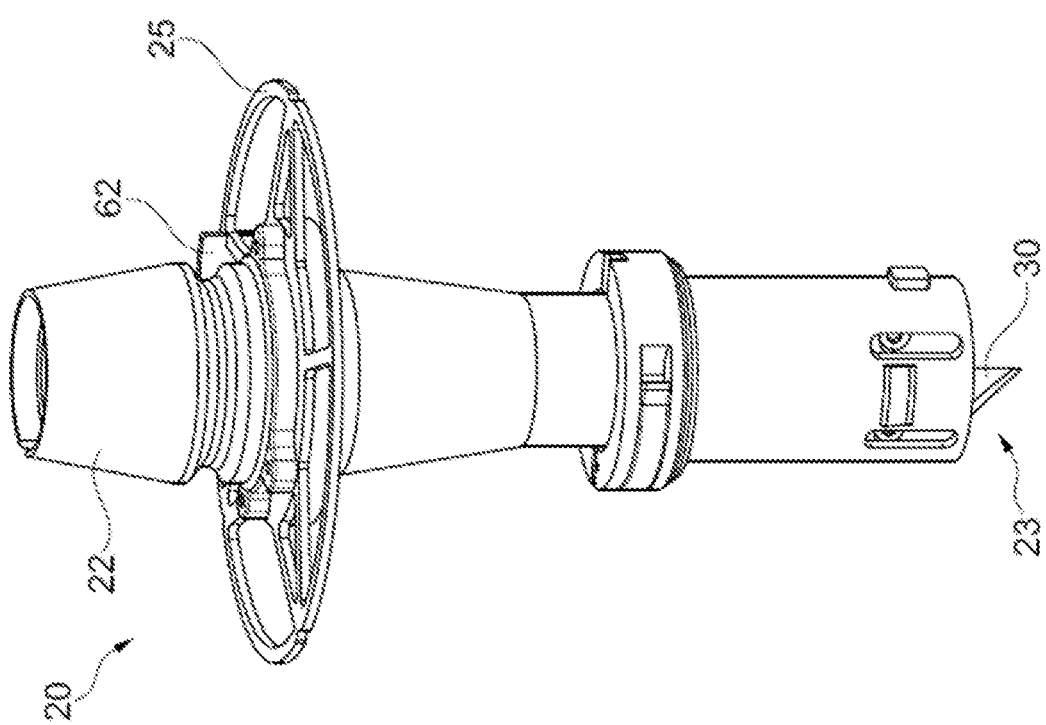
Figure 4C:
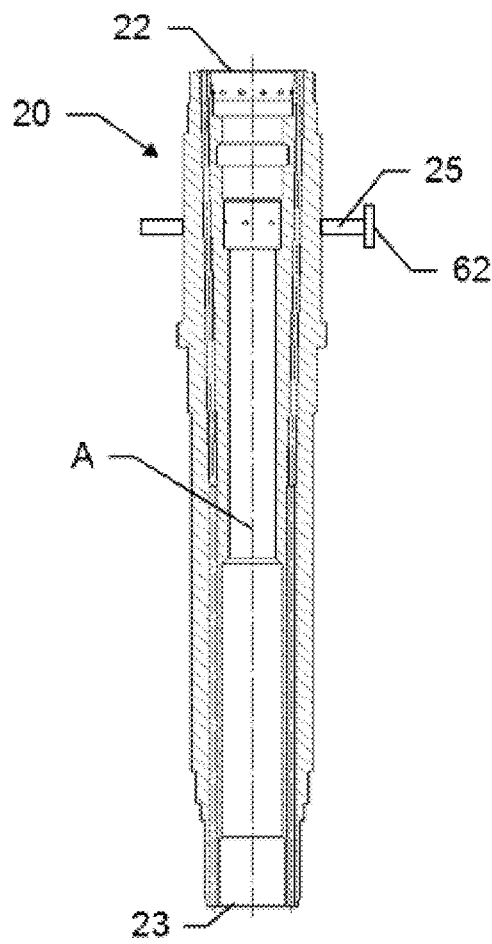

Various exemplary embodiments of a cutting tool 20 according to the invention are illustrated in FIGS. 4a-c.

FIGS. 4a and 4b show a first and a second exemplary embodiment, wherein the cutting tool of FIG. 4b additionally comprises a sliding block 40, in contrast to the cutting tool of FIG. 4a. FIG. 4c shows a third exemplary embodiment of a cutting tool 20 according to the invention in a sectional view.

The illustrated cutting tools 20 each have a longitudinal axis A, at the first (upper) end of which a connecting element 22 is provided for the connection to the cutting machine, and at the second (lower) end of which the cutter holder 23 is provided for accommodating the replaceable cutter. The cutting tools 20 each additionally comprise a supporting device 25, which advantageously enables a machine handling of the cutting tool, in particular a provision in a tool changing unit (see FIGS. 6a-b) of the cutting machine for an automatic introduction and replacement of the cutting tool 20.

A code element having an optically detectable identification code 62 is provided on this supporting device. This can be in particular a two-dimensional code, for example, a DataMatrix code or a QR code, and provides individual items of identification information of the cutting tool 20 so they are detectable by an optical sensor unit. The individual items of identification information enable the association with an individual cutting tool 20, thus enable a recognition of a specific tool and not only the tool type. The optically detectable identification code 62 can also be provided in the form of a barcode. If the optical sensor unit is designed for script recognition, the optically detectable identification code 62 can also be provided in the form of numbers or other characters.

Alternatively, the code element can also provide non-optically detectable identification codes, which can be detectable either in a contactless manner—for example, in the form of an RFID chip—or in a contact-based manner—for example, in the form of a code which can be mechanically scanned or read out via electronic contacts. The code element can also be designed for near-field communication with a sensor unit of the cutting machine.

Figure 5:
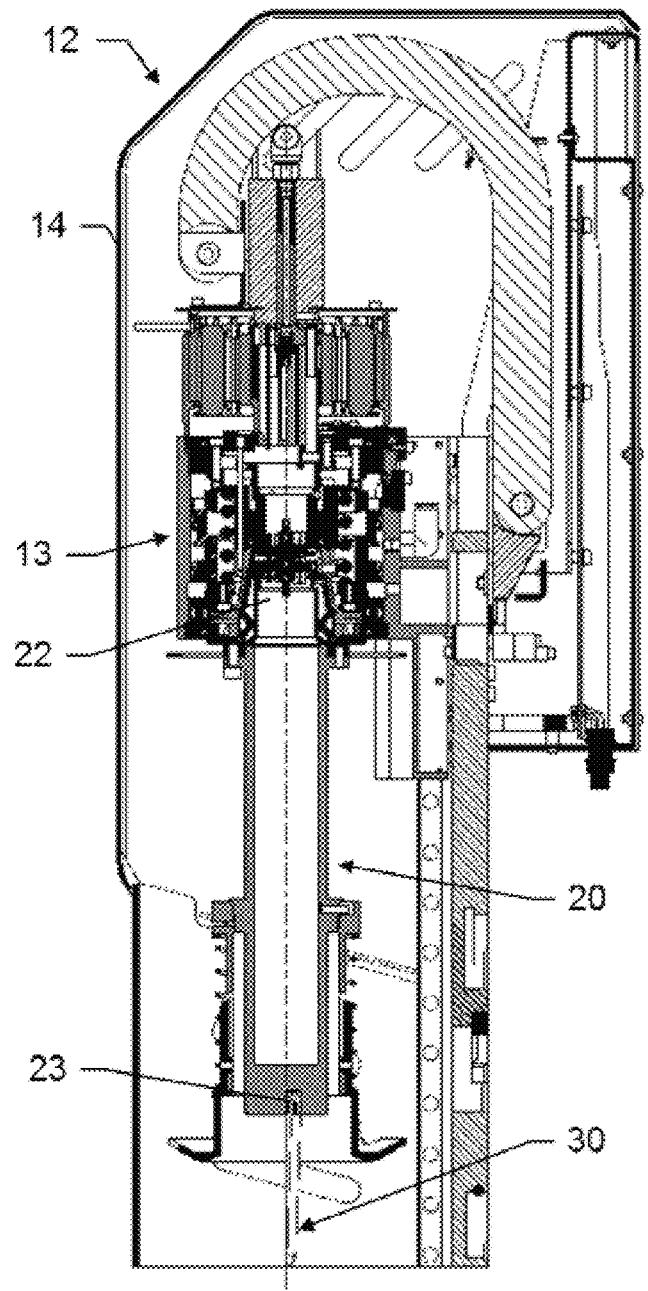
FIG. 5 shows a section through a working group of a first exemplary embodiment of a cutting machine according to the invention having an inserted replaceable tool.

FIG. 5 shows a sectional illustration of the working group 12 of a first exemplary embodiment of a cutting machine according to the invention, in which a cutting tool 20 is inserted. A cutter 30 is inserted into the cutter holder 23. The working group 12 comprises a cover hood 14, under which a receptacle device 13 for accommodating the replaceable cutting tool 20 is arranged. The receptacle device 13 and the connecting element 22 of the cutting tool 20 are designed for automated replacement of the cutting tool.

Figure 6B:
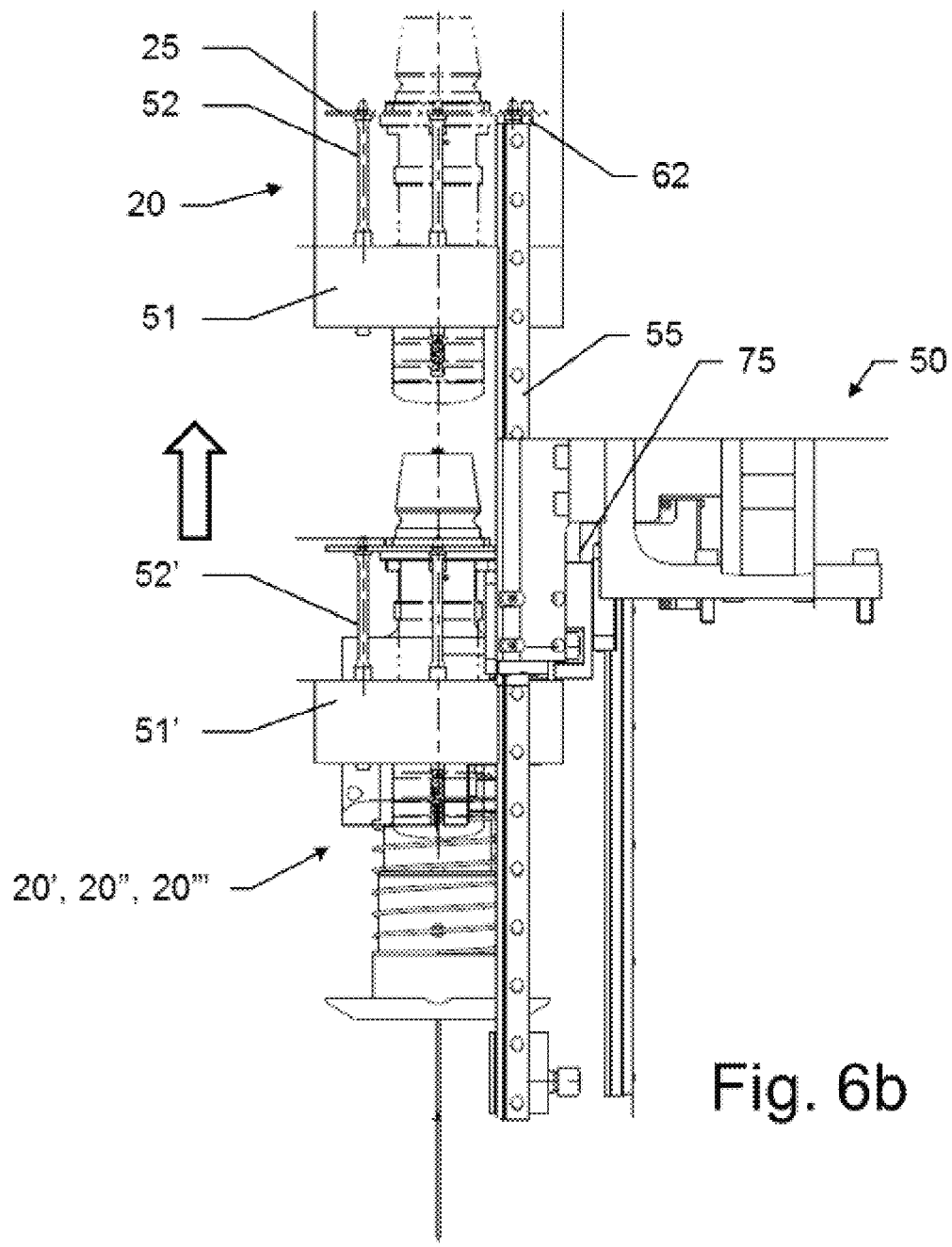

FIGS. 6a and 6b show an exemplary tool changing unit 50 as part of the first embodiment of the cutting machine according to the invention. The tool changing unit 50 shown is designed to provide a plurality of different cutting tools 20, 20', 20", 20'''. For this purpose, it has a plurality of holding devices 51.

A sensor unit 75 is attached to the tool changing unit 50. It is designed to detect the identification codes 62 of the cutting tools and to read out the items of identification information in order to make an individual cutting tool automatically recognizable. The sensor unit 75 is preferably positioned such that a code 62 can be detected when the respective cutting tool 20 is located in the holding device 51. In the embodiment shown, each of the holding devices 51 comprises three supports 52, which are designed to contact the supporting device 25 of the respective cutting tool 20, which also comprises a code element, on which the identification code 62 is provided. The sensor unit 75 is attached to the tool changing unit 50 in such a way that this code 62 is detectable.

Moreover, the tool changing unit is designed to enable automated insertion of a cutting tool 20 into the receptacle device and automated replacement of the cutting tool inserted into the receptacle device with another cutting tool 20', 20", 20''', which is provided in the tool changing unit 50. For this purpose, it is positioned on the cutting machine in relation to a movement range of the working group in such a way that the receptacle device can be positioned above the tool changing unit 50 for the automated insertion or replacement of a cutting tool 20. In this case, the sensor unit 75 can also be positioned so that the code 62 is detectable upon a removal of the tool from the holding device 51.

A detection of the code 62 simplifies the automated selection of the correct cutting tool 20 for insertion into the receptacle device 13.

In the embodiment illustrated in FIG. 6a, the holding units 51 are movable, and the sensor unit 75 is fixedly positioned. For the manual or automatic insertion of a cutting tool into a free holding unit 51, it is moved to the position of the sensor unit 75. The code 62 can be read out during the insertion, wherein the cutting tool is associated with the holding unit, so that the code no longer has to be read out during the removal for the insertion. Alternatively, each of the holding units 51 can comprise a sensor unit 75.

In an alternative embodiment, the sensor unit 75 is provided on a lifting device 55. The lifting unit and the sensor unit can be horizontally displaced together to the position of a desired holding unit 51. The holding units 51 thus approached can be vertically moved by means of the lifting device, i.e., raised and lowered again. The holding unit 51 can be raised for the manual and automatic replacement. The sensor unit 75 is positioned, for example, so that it can read the code when the holding unit 51 is lowered.

The sensor unit 75 in the changing unit 50 can preferably be a line scan camera. This enables a readout of an optical code as it moves past.

Before the insertion of the cutting tool into a free holding unit 51, a cutter can preferably be associated with the cutting tool. This can be performed manually, for example, via a user interface having keyboard or barcode read device, which can be provided on a control panel of the cutting machine or an external setup station. In particular, in this case an individual code or a type code of the cutter can be detected, wherein the cutter code can be linked to the individual code of the cutting tool in a database. A type code can be used in this case for a plausibility check of the correct cutter. An area scan camera can preferably be used to manually detect a code, in particular a DataMatrix code, for example, at the setup station ("setup station sensor unit").

Figure 7:
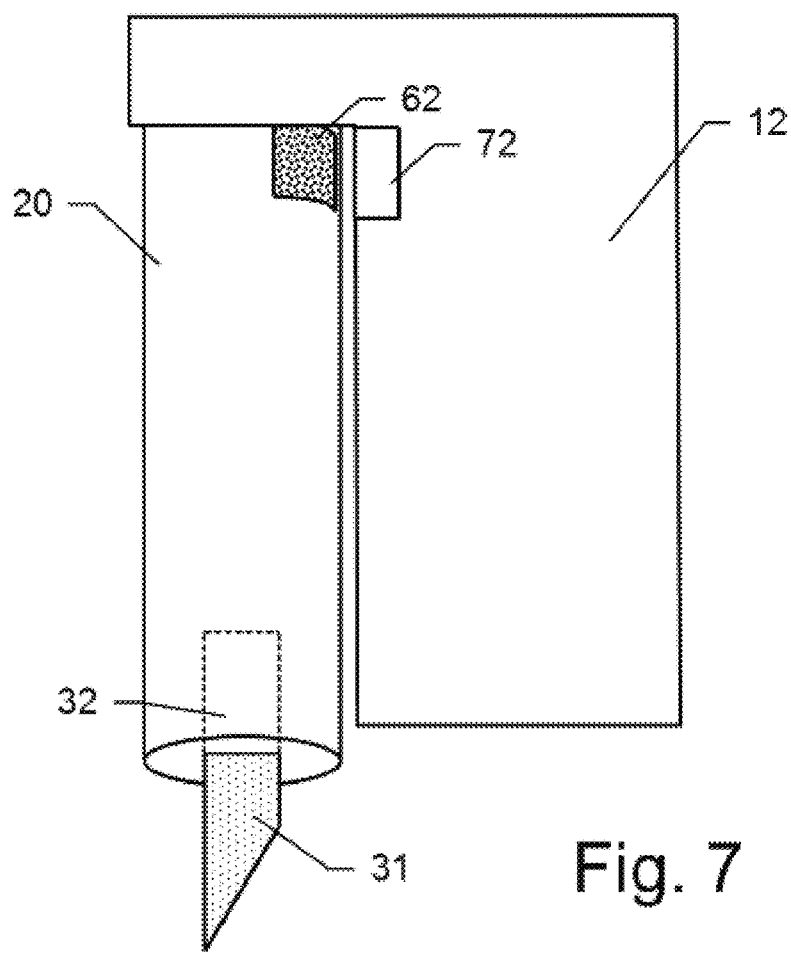
FIG. 7 shows a second exemplary embodiment of a replaceable tool according to the invention and a working group of a second exemplary embodiment of a cutting machine according to the invention.

A second embodiment of a cutting machine according to the invention is illustrated in FIG. 7. The working group 12 is shown, on which a replaceable cutting tool 20 having inserted cutter is attached. The cutter is introduced with the holding region 32 into the cutting tool 20, so that the blade 31 protrudes. In this embodiment, a sensor unit 72 is positioned on the working group 12 so that an identification code 62 applied to the cutting tool 20 can be detected when the cutting tool is inserted into the receptacle device of the working group 12.

Figures 8A, 8B:
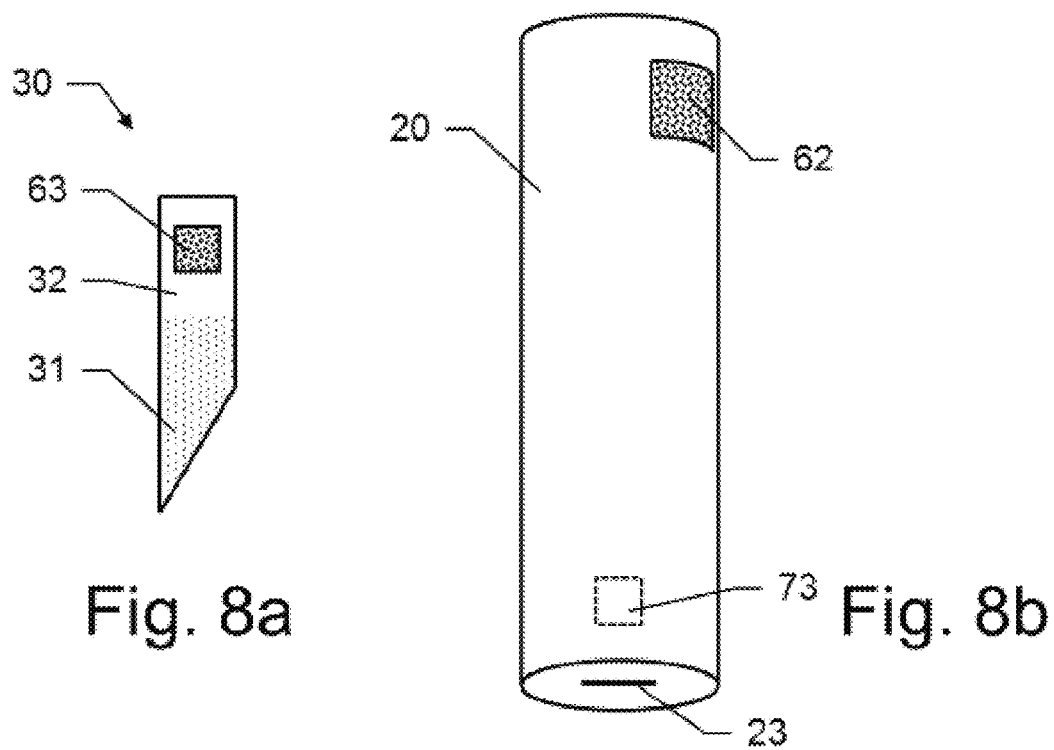

A third embodiment of a cutting machine according to the invention is illustrated in FIGS. 8a-c. In contrast to the second embodiment of FIG. 7, the cutter 30 comprises a separate identification code 63 on the holding section 32 here. The tool 20 comprises a separate sensor unit 73, which is designed to detect the code 63 when the cutter 30 is introduced into the cutter holder 23.

A fourth embodiment of a cutting machine according to the invention is illustrated in FIG. 9. In contrast to the third embodiment of FIGS. 8a-c, a second sensor unit 73' is attached externally on the working group 12. The identification code 63 of the cutter 30 is detected before it is inserted into the tool by the user guiding it past the sensor 73' or stopping it thereon.

The various embodiments can also be combined with one another, of course. Thus, for example, the second sensor unit 73' could be attached to the tool changing unit 50, or the cutting machine could comprise sensor units 72, 75 both on the tool changing unit 50 and also on the working group 12 or a control panel.

In particular if the first sensor unit is attached in the tool changing unit, a further one can be attached on a setup station for the linkage ("marrying") of tool 20, cutter 30, and optionally sliding block 40 (cf. FIG. 4b). This setup station can be arranged in an operating panel of the cutting machine 1, but can also be separate and available for one or more cutting machines. At this setup station, cutting tools 20 are equipped with cutters 30 and possibly sliding blocks 40, in particular manually by a user of the cutting machine(s). The setup station can comprise a sensor unit ("setup station sensor unit"), in particular in the form of an area scan camera, which is connected to a processing unit. The setup station sensor unit can in particular replace or supplement the second sensor unit 73, 73'.

Tool 20, cutter 30, and sliding block 40 comprise for this purpose codes, for example, DataMatrix codes, detectable by the setup station sensor unit. Cutting tool 20, cutter 30, and sliding block 40 can be logically linked to one another in a database by means of the setup station sensor unit by successive detection of the respective codes, such that a present equipment of each individual cutting tool 20 is known to the processing unit. The operational monitoring can thus be performed in bundled form for tool, cutter, and sliding block.

Figure 10:
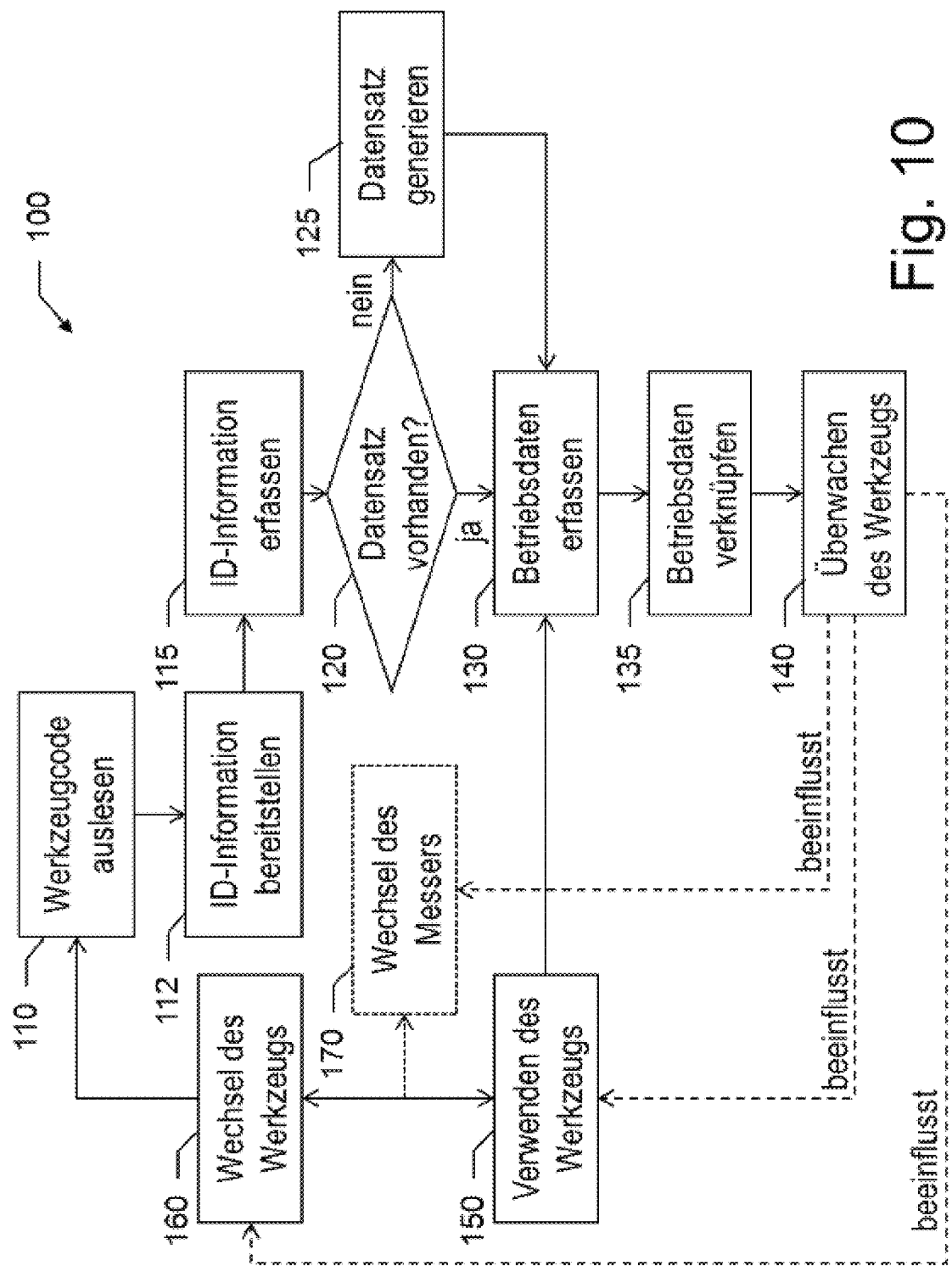
FIG. 10 shows an exemplary embodiment of a method according to the invention.

FIG. 10 shows a flow chart to illustrate an exemplary embodiment of a method 100 according to the invention. In the scope of this method, firstly an identification code of a cutting tool is read out 110 by a corresponding sensor of the cutting machine. This takes place in particular in each case upon a change 160 of the tool. The items of identification information (items of ID information) preferably also comprise items of information about the tool type. The items of information encrypted in the code are provided 112 to a processing unit of the cutting machine and received and detected 115 thereby. It is then checked 120 by the processing unit whether a corresponding dataset is already provided in a database. If not, such a dataset is created 125. Operating data of the cutting tool are subsequently detected 130. It is presumed in this case that the cutting tool, the items of identification information of which were provided by the sensor, is also the tool used 150 in the cutting machine. The operating data comprise in particular a duration and intensity of the tool usage. Data about the processed material can also be comprised. The detected operating data are linked 135 in the database to the corresponding cutting tool. The linked data of the tool or preferably a plurality of identical and/or different tools are then used to carry out operational monitoring 140 ("monitoring") of the tool or the tools. The operational monitoring 140 influences which tools are used 150 when they are replaced 160, for example, for maintenance, and under certain circumstances also when one cutter of the tool is replaced 170 with a new one.

The operational monitoring 140 can be used in particular as a basis for defining replacement and maintenance rhythms. Thus, after a specific operating time of a cutting tool, a replacement of this cutting tool by an identical one can be automatically triggered by the processing unit—for example, an automatic replacement by means of a tool changing unit or manual replacement by outputting a handling instruction to a user of the cutting machine. The replacement of a cutter, which is presumably worn out on the basis of the detected operating data, can also be initiated. Tools can be used on various cutting machines in this case, and one cutter can be used in various tools.

Performance data of the cutting tool can optionally also be detected as operating data. The operational monitoring can then comprise a recognition of patterns and machine learning (ML) based thereon. Thus, for example, regularly occurring performance decreases and/or performance collapses of specific cutting tool types after specific operating times can be recognized as patterns. These patterns can then be used to adapt the replacement interval for this cutting tool type. If multiple cutting machines and/or processing units are connected to one another to form a network for a data exchange, for example, via the "Internet of things" (IoT), the pattern recognition and the ML can be performed system wide and can accordingly be more efficient. The findings of the ML can then be output as feedback to all machines connected to the IoT network, so that, for example, the maintenance intervals can be adapted accordingly.

In some embodiments of the cutting machine, a further sensor system is attached for the initialization of the tools in the Z direction. It is embodied as optical. After the initialization, the image of the cutter can be compared to the geometry data in the database to check for plausibility whether the correct cutter is inserted. This sensor system is helpful in particular if cutter information is not input automatically, but rather has to be manually detected by a user during the manual insertion of the cutter by a user. FIG. 11 shows a line scan sensor 80 as a sensor of such an exemplary embodiment of a cutting machine according to the invention. This is arranged below the plane of the work surface 10, for example, at the edge of the work surface 10 or in a depression. The working group of the cutting machine is movable so that the cutting tool 20 is positionable above the line scan sensor 80 and can be lowered at this position in such a way that a cutter 30 inserted into the cutting tool 20 is guided vertically through a horizontal plane detected by the line scan sensor 80. Alternatively or additionally, the line scan sensor can also be designed as movable in the direction of the cutting tool 20.

The shape of the cutter blade can thus be ascertained by the line scan sensor 80, wherein deformation and damage to the blade are recognizable and can be transmitted to the processing unit to trigger a replacement of the cutter 30 or the entire cutting tool 20, respectively. A plausibility check can advantageously also be performed, in which a known blade shape of a cutter 30 presumably inserted into the cutting tool 20 is compared to the ascertained shape of the cutter 30 actually located in the cutting tool 20. In this manner, errors during the manual insertion of a cutter or during the detection of the cutter data at the setup station before the use of the cutter can be recognized. This can advantageously prevent damage to the object to be cut, to the work surface 10, or to the cutting tool 20, for example, if the inserted cutter is longer than the cutter, the data of which were incorrectly linked to the cutting tool 20.

It is obvious that these illustrated figures only schematically illustrate possible exemplary embodiments. The various approaches—in particular of the first and second aspect of the invention—can also be combined with one another and with devices or methods of the prior art.

The invention claimed is:

1. A cutting machine comprising:
   a work surface, which is designed to accommodate at least one object to be cut,
   a working group, which is arranged so it is movable above the work surface and comprises a receptacle device for accommodating a first replaceable cutting tool, and
   a processing unit comprising a processor having processing capacity and algorithms for controlling the cutting machine and storage capacity for providing a database, wherein
   a tool changing unit for providing a plurality of cutting tools, wherein the processing unit is designed to control an automated insertion of one of the cutting tools provided in the tool changing unit into the receptacle device, wherein the tool changing unit
   comprises a plurality of holding devices for providing the plurality of cutting tools, and
   comprises at least one first sensor unit for detecting individual items of identification information of the cutting tools,
   wherein the first sensor unit is designed to
   detect the individual items of identification information of a first cutting tool when it is located in a first holding device or is inserted into the first holding device, and provide the detected items of identification information to the processing unit, wherein the processing unit is designed to, recognize cutting tools based on the provided items of identification information, store items of information about recognized cutting tools in the database, and based on the detected individual items of identification information, select which of the cutting tools provided in the tool changing unit is inserted into the receptacle device.

2. The cutting machine according to claim 1, wherein the processing unit is designed to detect operating data of a cutting tool inserted into the receptacle device and to store these data in the database, wherein the operating data comprise at least one operating time of the cutting tool, and the processing unit is designed to also select, based on operating data of the plurality of cutting tools, which of the cutting tools provided in the tool changing unit is inserted into the receptacle device.

3. A cutting machine comprising a work surface, which is designed to accommodate at least one object to be cut, a working group, which is arranged so it is movable above the work surface and comprises a receptacle device for accommodating a first replaceable cutting tool, wherein the cutting machine comprises a processing unit or is connectable to a processing unit, wherein the processing unit comprises a processor having processing capacity and algorithms for controlling the cutting machine and storage capacity for providing a database, wherein a first sensor unit, which is designed to detect individual items of identification information of the first cutting tool and to provide detected items of identification information to the processing unit, wherein the processing unit is designed to recognize the first cutting tool based on the items of identification information, detect operating data of the first cutting tool, and store these data in the database, wherein the operating data comprise at least one operating time of the cutting tool, and carry out operational monitoring of the first cutting tool based on the operating data.

4. The cutting machine according to claim 3, wherein the processing unit is designed to store items of identification information of a plurality of replaceable cutting tools in the database, detect operating data for each cutting tool of the plurality of cutting tools and store these data in the database, and carry out operational monitoring of the plurality of cutting tools based on the operating data.

5. The cutting machine according to claim 3, wherein the operational monitoring comprises monitoring of operating times and/or states of the plurality of cutting tools and/or cutters inserted into the cutting tools, wherein the processing unit is designed, based on the operational monitoring, to define a maintenance interval for a first cutting tool;

trigger maintenance for a first cutting tool, define a maintenance interval for a plurality of cutting tools, in particular for two or more congeneric cutting tools, trigger a replacement of the first cutting tool, define a replacement interval for cutters, and/or trigger a replacement of a cutter.

6. The cutting machine according to any one of claims 3, wherein a tool changing unit for the automated insertion of a cutting tool into the receptacle device, wherein the sensor unit is attached to the tool changing unit and is designed to detect the items of identification information of the first cutting tool when the first cutting tool is located in the tool changing unit or is inserted into the receptacle device, in particular wherein an automatic selection of the first cutting tool for insertion into the receptacle device is based on the detected items of identification information of the first cutting tool, and in particular wherein the tool changing unit;

is designed for the automated replacement of a cutting tool located in the receptacle device with another cutting tool, wherein the other cutting tool is provided in the tool changing unit;

is designed to provide a plurality of different cutting tools;

is positioned on the cutting machine in relation to a movement range of the working group in such a way that the receptacle device is automatically positionable on the tool changing unit for the automated insertion or replacement of the first cutting tool, in particular is positionable above the tool changing unit; and/or comprises a plurality of holding devices for providing a plurality of cutting tools, wherein each of the holding devices comprises at least one support (52), which is designed to contact a supporting device of a provided cutting tool, wherein the sensor unit is attached to the tool changing unit and is designed to detect items of identification information of the first cutting tool provided on the supporting device of the first cutting tool when the first cutting tool (20) is located in the tool changing unit.

7. The cutting machine according to claim 1, wherein the first sensor unit is an optical sensor unit, which is designed to detect an optically detectable identification code, in particular a DataMatrix code, on the first cutting tool; and/or comprises an RFID read device, which is designed to detect on identification code provided in an RFID transponder of the cutting tool; and/or is designed to mechanically contact the cutting tool to read out the items of identification information, in particular to establish an electrical contact with a storage unit of the cutting tool or to scan a raised identification code applied to a surface of the cutting tool, wherein the identification code in each case provides the individual items of identification information of the first cutting tool so they are detectable by the first sensor unit.

8. The cutting machine according to claim 1, wherein the first cutting tool comprises a cutter holder for accommodating a holding section of a cutting machine cutter; and the processing unit is designed to link the first cutting tool to the cutter in the database, in particular wherein the cutting machine comprises a second sensor unit, which is designed to detect individual items of identification information of the cutter and to provide detected items of identification information to the processing unit, in particular wherein the second sensor unit is an optical sensor unit, which is designed to detect an optically detectable identification code on the cutter, wherein the identification code provides the individual items of identification information of the cutter so they are detectable by the second sensor unit; and the processing unit is designed to
recognize the cutter based on the items of identification information,
detect operating data of the cutter and store these data in the database, wherein the operating data at least comprise an operating time of the cutter,
link the operating data of the first cutting tool and operating data of the cutter to one another in the database,
carry out operational monitoring of the cutter based on the operating data, and/or
also based on operating data of a plurality of cutters, select which of the cutting tools provided in a tool changing unit of the cutting machine is inserted into the receptacle device.

9. The cutting machine according to claim 8, wherein
the cutting machine comprises a setup station sensor unit, in particular designed as an area scan camera, which is designed to detect individual items of identification information of the first cutting tool and the cutter and to provide detected items of identification information to the processing unit,
the processing unit is designed to recognize the first cutting tool and the cutter based on the items of identification information, in particular wherein
the setup station sensor unit is arranged on a setup station associated with the cutting machine, in particular a control panel of the cutting machine, in such a way that the first cutting tool and the cutter can be manually moved toward the setup station sensor unit by a user of the cutting machine in such a way that an identification code of the first cutting tool and/or the cutter, which provides the individual items of identification information so they are detectable by the setup station sensor unit, is detectable by the sensor station sensor unit;
the processing unit is designed to link a cutting tool and a cutter to one another in the database, the individual items of identification information of which were detected successively by the setup station sensor unit; and/or
the setup station sensor unit is designed to detect individual items of identification information of a sliding block, which is designed to be connected to the first cutting tool, wherein the processing unit is designed to recognize the sliding block based on the items of identification information and to link it in the database to the first cutting tool and the cutter.

10. The cutting machine according to any one of the preceding claim 1,
wherein
a blade sensor, in particular designed as a line scan sensor, for detecting a blade shape of a cutter inserted into the first cutting tool, in particular wherein items of information about a plurality of cutter types are stored in the processing unit and comprise items of information about a blade shape of the respective cutter type, and
the processing unit is designed to ascertain a cutter type of the cutter inserted into the first cutting tool on the basis of the blade shape detected by the blade sensor.

11. A cutting tool for use in a cutting machine according to claim 1, wherein the cutting tool is designed as replaceably insertable into a receptacle device of the cutting machine and comprises a cutter holder for accommodating a holding section of a cutting machine cutter,
wherein
the cutting tool comprises a code element, which provides individual identification data of the cutting tool so they are detectable by a first sensor unit of the cutting machine, wherein the individual identification data are designed to enable an individual identification of the cutting tool.

12. A method for operating a cutting machine having a plurality of replaceable cutting tools, in particular for operating a cutting machine according to any one of claims 1, comprising
detecting individual items of identification information of a first cutting tool by means of a first sensor unit of the cutting machine;
providing detected items of identification information to a processing unit of the cutting machine;
detecting the items of identification information and identifying the first cutting tool based on the items of identification information by way of the processing unit;
detecting and storing operating data which can be associated with the first cutting tool, and linking the operating data to the first cutting tool in a database of the processing unit, wherein the operating data comprise at least one operating time of the cutting tool; and
operational monitoring of the cutting tool based on the operating data.

13. The method according to claim 12,
wherein
the operational monitoring comprises monitoring of operating times and/or states of the plurality of cutting tools and/or cutting machine cutters inserted into the cutting tools, wherein the method comprises, on the basis of the operational monitoring,
defining a maintenance interval for a cutting tool;
triggering maintenance for a cutting tool,
defining a replacement interval for cutting tools, in particular for two or more congeneric cutting tools,
triggering a replacement of a cutting tool,
defining a replacement interval for cutters, and/or
triggering a replacement of a cutter.

14. The method according to claim 12,
wherein
an initial linkage of the first cutting tool to a cutting machine cutter to be used jointly therewith, comprising
detecting the individual items of identification information of the first cutting tool by means of a setup station sensor unit;
detecting individual items of identification information of the cutter (30) by means of the setup station sensor unit;
providing the items of identification information detected by the setup station sensor unit to the processing unit;
identifying the first cutting tool and the cutter based on the items of identification information by way of the processing unit;

linking the first cutting tool and the cutter in the database of the processing unit; and inserting the cutter into the first cutting tool.

15. A computer program product having program code, which is stored on a machine-readable carrier, for executing the method according to claim 12 for operating a cutting machine wherein the program is executed in a processing unit of the cutting machine.

\* \* \* \* \*